Aug. 3, 1937.  C. R. WAGNER  2,088,823
POLYMERIZATION OF UNSATURATED HYDROCARBON
Filed Oct. 10, 1932
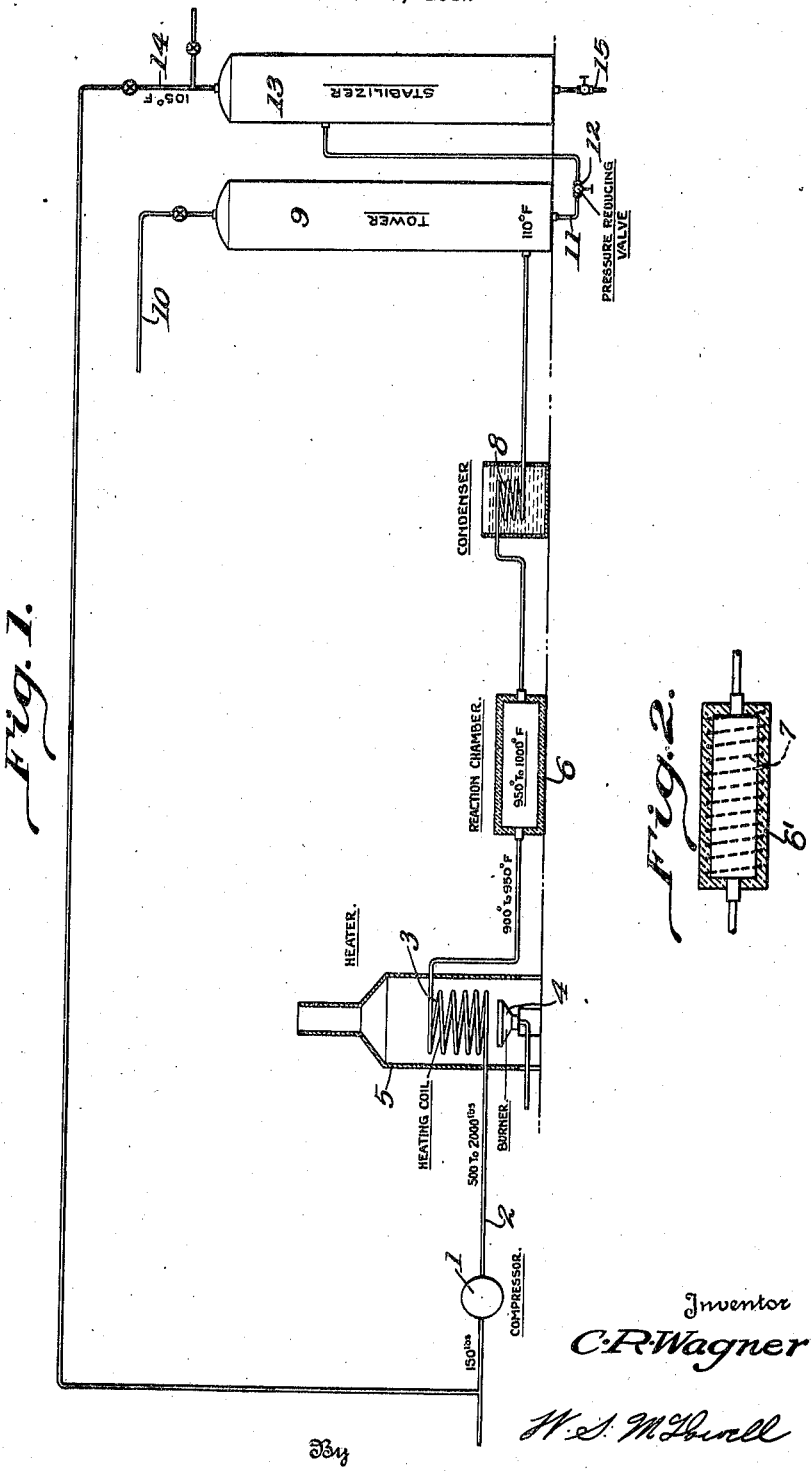

Patented Aug. 3, 1937

2,088,823

UNITED STATES PATENT OFFICE 2,088,823

POLYMERIZATION OF UNSATURATED HYDROCARBON

Cary R. Wagner, Chicago, Ill., assignor to The Pure Oil Company, Chicago, Ill., a corporation of Ohio Application October 10, 1932, Serial No. 637,031

6 Claims. (Cl. 196—10)

This application is a continuation-in-part of my earlier and co-pending application bearing Serial No. 333,756, filed January 19, 1929, which matured into Patent No. 2,028,886 on January 28, 1936.

This invention relates to an improved process for producing liquid hydrocarbons suitable for use as motor fuel, through the polymerization of compounds present in hydrocarbon gases.

In the operation of certain types of pyrogenic cracking processes wherein high boiling point liquid hydrocarbons are molecularly decomposed into hydrocarbons of lower boiling range, a certain proportion of the hydrocarbons treated are discharged in the form of what is known as "fixed gas". The ratio of gas to liquid depends to a large extent upon the conversion temperatures utilized in the process of cracking. Thus in the so-called vapor phase systems, wherein conversion temperatures of the order of 1000° F. or higher are attained by the oil vapors undergoing decomposition, a relatively large quantity of fixed gas is developed in proportion to the liquid condensate obtained as motor fuel. This proportion of fixed gas to liquid motor fuel decreases as the conversion temperatures are lowered, but in ordinary vapor phase operations approximately 60 cubic feet of fixed gas are produced for each gallon of liquid motor fuel. This figure is, of course, approximate and varies with the character of the charging stock and other conversion factors, principally time and temperature.

The question of the economic utilization of this fixed gas becomes a very important one in vapor phase systems of hydrocarbon pyrogenesis. Ordinarily, the fixed gas is too valuable and forms too large a per cent. of the products of conversion, to justify its use for combustion purposes in the furnace of the cracking system. Of course, a certain proportion of liquids is obtained from the gases following release thereof from the fractionating apparatus of a cracking system to the customary operation of passing the gas through a compressor, but even after this operation there still remains a relatively large quantity of fixed gas, which if not economically employed may render the operation of vapor phase cracking systems too costly, as compared with the liquid phase system of conversion, to justify commercial activities relative thereto.

It is, therefore, to the recovery of liquids from these fixed gases that the present invention is especially directed. I have discovered that when these hydrocarbon gases, which contain a high per cent. of unsaturates are passed into a reaction chamber at high pressures and temperatures (for example, 800 pounds per square inch and 800° F.) and subjected to these conditions for a desired period of time, polymerization reactions take place, without the employment of a catalyst, to the end of building up heavier compounds from said gases which are recoverable as liquids, and are well suited for use as motor fuels.

The invention is preferably carried out by passing a body of unsaturated hydrocarbon gases, of the type developed by the pyrogenic decomposition of oil vapors at temperatures above 1000° F., into a reaction chamber of any suitable mechanical type. Within this chamber the gases are maintained under pressures of between 500 to 2000 pounds per square inch, depending on operating conditions and the specific character of the hydrocarbons under treatment, and are held at temperatures varying between 650° to 1000° F. The rate of flow of the gases through this reaction chamber is regulated so that the gases are subjected to the conditions specified for a period of time varying between 15 seconds to 30 minutes. Under these conditions, the gases are in part, at least, polymerized to produce liquid compounds. I have observed that it is not necessary to utilize a catalyst in the reaction chamber, unless the metal walls of such reaction chamber may be considered to constitute a catalyst, it being understood that the reaction chamber is constructed from materials capable of withstanding the pressures and temperatures above noted. It is thought, however, that the walls of the reaction chamber have little or no effect on the gases under treatment in said chamber. In any event, this system does not utilize purposely a catalyst in securing the desired reactions and in this respect, together with others, the present invention may be distinguished from prior systems directed toward somewhat similar ends.

In the reaction chamber, the unsaturated hydrocarbons, such as ethylene $C_2H_4$, propylene $C_3H_6$, and butylene $C_4H_8$, which possess what is known as a double bond, when properly treated under the conditions set forth, will react with each other to form additive compounds of higher molecular weights. The operating conditions specified can be regulated so that these compounds can be kept at such molecular weights as to render them suitable for use as motor fuels. The following table sets forth the results secured by four independent operations:

| Run number | 1 | 2 | 3 | 4 |
|---|---|---|---|---|
| Time | 18-20 sec. | 18-20 sec. | 18-20 sec. | 18-20 sec. |
| Pressure (lbs. sq. in.) | 800 | 800 | 800 | 800 |
| Temperature °F | 850 | 750 | 700 | 650 |
| Sp. grav. inlet gas | 1.068 | | 1.025 | 0.993 |
| Sp. grav. exit gas | 0.980 | 0.992 | 1.015 | 0.954 |
| Percent unsats. inlet gas | 53.6 | | 52.0 | 53.1 |
| Percent unsats. exit gas | 43.0 | 49.3 | 49.8 | 49.3 |
| Total gas passed cu. ft | 2380 | 2470 | 2470 | 2360 |
| Cu. ft. per minute | 4.96 | 5.14 | 5.13 | 4.91 |
| Temp. into chamber | 796 | 740 | 717 | 659 |
| Temp. out of chamber | 844 | 735 | 696 | 635 |
| Gal. E. P. gasoline M cu. ft | 1.47 | 1.52 | 0.42 | 0.19 |
| Grav. of gasoline | 53.2 | 61.8 | 53.1 | 45.8 |
| Initial | 100 | 85 | 100 | 127 |
| 20% | 152 | 116 | 144 | 182 |
| 50% | 205 | 168 | 195 | 223 |
| 90% | 339 | 322 | 317 | 335 |
| End pt | 422 | 413 | 420 | 409 |

It is very evident from the above with the gravity and distillation range of these liquid hydrocarbons that they will prove highly anti-knock as motor fuels, since they appear to consist largely of benzol derivatives. This character of the product is due to the type of reaction, since little heat is evolved in the polymerization of olefines except when cyclic compounds are formed as here.

By this system of gasoline recovery a very considerable improvement is made in the percentage of liquid motor fuel produced by vapor phase systems of cracking from a given quantity of charging stock, such as gas oil, the process improving the yield of recovered liquid motor fuel to the extent of approximately 5% of the total quantity of charging stock utilized. Thus if a cracking system yields 40% of liquid motor fuel from the total quantity of the charging stock inserted therein, the balance being removed from the system in the form of fuel oil and fixed gas, the present invention will enable the system to yield liquid motor fuel to the extent of 45% of such charging stock, decreasing correspondingly the relative quantities of gas and fuel oil. It will be understood that the products leaving the reaction chamber of the apparatus are suitably cooled and condensed to separate the gaseous and liquid components.

An important feature of this invention relates to a process of converting gases and vapors into low boiling point liquid polymers by the application of heat to such gases while under suitable pressures, and one of the important objects of the invention is to bring about the polymerizing reaction so as to result in a conversion of a high percentage of the gases into low boiling point oils adapted for use as motor fuels, as above stated.

In the accompanying drawing:

Fig. 1 is a diagram of apparatus that may be used to carry out the process of this invention, but the apparatus indicated is only illustrative, and can be varied by those acquainted with the resources of the art;

Fig. 2 is an optional form of apparatus wherein a slight amount of heat may be externally applied to the reaction drum.

In the drawing, the numeral 1 designates a compressor from which leads a pipe line 2 by which a cracked hydrocarbon gas under a pressure of from 500 to 2000 pounds per square inch may be advanced through a heating coil 3 arranged adjacent to the burner 4 of a suitable heater 5. The gases are retained in the coil 3 for a sufficient period of time to permit them to attain a temperature varying between 700 to 1000° F. and preferably 900 to 950° F., and these heated gases are then delivered, without material reduction in pressure to an external reaction chamber 6. The chamber 6 is located exteriorly of the heater and is preferably covered with a suitable heat insulating material in order to prevent heat losses and to maintain the gases at reaction temperatures. Since the reaction chamber is of considerably greater diameter than the tubes of the coil 3, the gases travel at a slower velocity through said reaction chamber than through the coil 3. The polymerizing reactions are completed in the chamber 6 with an accompanying exothermic rise in their temperature. This will be noted by reference to the drawing wherein the inlet temperatures of the gases entering the reaction chamber may be of the order from 900 to 950° F., whereas the outlet temperatures are of the order from 950 to 1000° F. As above stated, if desired, as shown in Fig. 2, a small amount of external heat may be applied to the reaction chamber through the medium of the electric resistance coil 7. It will be understood that it is not the purpose of this coil to apply any considerable amount of heat to the gases in the reaction chamber but merely to maintain optimum temperatures of polymerization. This result is preferably secured, however as shown in Fig. 1, by merely applying a suitable thickness of heat insulating material around the metallic walls of the chamber.

From the reaction chamber, the products are conducted to a condenser 8, and thence to a separating tower 9. Fixed gas may be released from the top of the tower 9 through a valved outlet line 10, whereas the liquefied products may be withdrawn through a pipe line 11 provided with a pressure reduction valve 12 and delivered to a stabilizer 13, which operates under considerably lower pressure than the tower 9. If desired, stabilizer gases, rich in olefins, may be removed from the top of the stabilizer through a valved line 14 and returned to the inlet side of the compressor 1, or other suitable use may be made of these gases. The stabilized liquid removed from the bottom of the column 13 through the valved pipe line 15 may be used as motor fuel.

A suitable process designed to accomplish the formation of liquid polymers with the application of a minimum amount of heat at close temperature control with the removal of products of the reaction is described as follows:

The most suitable gases to use to be converted into motor fuel by a polymerization reaction are those such as the olefins, viz.: ethylene and its homologues. Since the paraffins do not form polymers they are excluded, but gases resulting from the cracking operations on petroleum compounds, containing, preferably over 25% of olefins are available for use as the raw material of this process. To adapt certain gaseous hydrocarbons, appearing as by-products of various refining operations, to successful treatment, the percentage of olefins present may be raised by the addition of concentrates of gaseous hydrocarbons, high in olefins, such as can be obtained by the use of well known fractionating apparatus.

The control of the process is furthermore facilitated by recognizing and utilizing the well known chemical and physical characteristics of the bodies under treatment, for instance, the well-known property of ethylene to enter directly into combination with a great variety of substances, and, if in a particular treatment, the reaction should take place with a shortage of the even more reactive higher olefins, it may be accelerated by introducing a small proportion of them to promote the reaction of the ethylene present.

Since the formation of the liquid polymers results from an exothermic reaction, no heat need be supplied to the reaction chamber 6, when the gases are of the right nature to promote the progress of the reaction, which takes place especially freely when ethylene predominates, and when near the upper limits of the temperature and concentration found to be advisable to practice in the process.

Pressures of from 500 to 2000 pounds per square inch may be used, and temperatures from 700 to 1000° F.

While, as stated above, under optimum conditions of correct temperature and pressure, acting on suitable hydrocarbon gases, the polymerization reaction is sufficiently exothermic to proceed without the addition of heat to the reaction chamber, conditions in some applications of the process may make it advisable to supply a small quantity of heat at some stages of the reaction, enough to keep it at an isothermal level. This additional heat can be supplied directly to the chamber itself. For example, a reaction chamber 6' equivalent to the reaction chamber 6 is shown in Fig. 2, wherein this small quantity of heat may be supplied by the resistance coil embedded in the insulation adjacent the reaction chamber, as shown.

In my prior and co-pending application, of which this application is a continuation-in-part also, Ser. No. 354,426, filed April 11, 1929, I have disclosed and claimed the generic invention with claims thereto of a primary heating zone to initiate polymerization and a main reaction zone to complete the exothermic polymerization, as distinguished from the application directed to the species herein claimed.

What is claimed is:

1. In a process for obtaining low boiling point hydrocarbon liquid polymers predominantly of the motor fuel range from olefinic hydrocarbon gases, continuously compressing said gases to a pressure between 500 and 2000 pounds per square inch, subsequently passing said gases under such pressure through an elongated passageway of restricted cross sectional area while heating the gases therein to a temperature sufficient to initiate polymerization of said gases, then passing said gases through an enlarged zone under said pressure and at slower velocity while maintaining the gases in said zone for a period of time sufficient to obtain an exothermic reaction and at temperatures between 700 and 1000° F. without introducing any extraneous heat into the zone, and then separating low boiling point liquid polymers so produced.

2. In a process for obtaining low boiling point hydrocarbon liquid polymers predominantly of the motor fuel range from hydrocarbon gases of high olefin concentration, continuously compressing said gases to a pressure between 500 and 2000 pounds per square inch, subsequently passing said gases under such pressure through an elongated passageway of restricted cross sectional area while heating the gases therein to a temperature sufficient to initiate polmerization of said gases, then passing said gases through an enlarged zone under said pressure and at slower velocity while maintaining the gases in said zone for a period of time sufficient to obtain an exothermic reaction and at temperatures between 700 and 1000° F., and then separating low boiling point liquid polymers so produced.

3. Process in accordance with claim 1 in which the gases subjected to polymerization contain olefinic compounds in high concentration.

4. Process in accordance with claim 1 in which loss of heat in the reaction zone is substantially prevented.

5. A process for obtaining liquids boiling predominantly within the range of gasoline, which comprises compressing gases rich in olefins to high super-atmospheric pressure in the absence of added hydrogen, heating the compressed gas in a confined stream in a heating zone to a temperature suitable to induce polymerization of the compressed gases, passing the heated gases into a reaction zone of greater cross-sectional area than said heating zone, maintaining the gases in said reaction zone without substantial reduction of pressure and at a suitable polymerization temperature without introducing extraneous heat into the zone, for a period of time sufficient to obtain an exothermic reaction and convert a substantial portion of said gases to liquids, and separating liquid polymers from gases remaining in the reaction products.

6. Process in accordance with claim 5 in which the reaction products are cooled, the uncondensed gases are separated from the condensible constituents while still under high super-atmospheric pressure and eliminated from the process, dissolved gases rich in olefins are thereafter separated from the normally liquid constituents, and the dissolved gases after separation are recycled and admixed with gases subjected to polymerization.

CARY R. WAGNER.

CERTIFICATE OF CORRECTION.

Patent No. 2,088,823. August 3, 1937.

CARY R. WAGNER.

It is hereby certified that error appears in the printed specification of the above numbered patent requiring correction as follows: Page 3, second column, line 14-15, claim 2, for the word "comprising" read compressing; and that the said Letters Patent should be read with this correction therein that the same may conform to the record of the case in the Patent Office.

Signed and sealed this 12th day of October, A. D. 1937.

(Seal)

Henry Van Arsdale.
Acting Commissioner of Patents.